(12) United States Patent  
Kuramochi et al.

(10) Patent No.: US 7,285,927 B2
(45) Date of Patent: Oct. 23, 2007

(54) CONTROL APPARATUS FOR ELECTRIC MOTOR OF INVERTER SYSTEM AND CONTROL APPARATUS FOR ELECTRO MECHANICAL BRAKE

(75) Inventors: Yuichi Kuramochi, Hitachinaka (JP); Toshio Manaka, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/546,355

(22) Filed: Oct. 12, 2006

(65) Prior Publication Data

US 2007/0029953 A1  Feb. 8, 2007

Related U.S. Application Data

(63) Continuation of application No. 11/052,742, filed on Feb. 9, 2005.

(30) Foreign Application Priority Data

Feb. 27, 2004  (JP) .............................. 2004-054501

(51) Int. Cl.  
*H02P 3/00* (2006.01)  
*B60T 13/74* (2006.01)

(52) U.S. Cl. .................. 318/139; 303/20; 303/112; 303/115.2; 303/122; 303/152; 318/139; 188/71.9; 188/72.1; 188/72.8; 188/158; 188/162

(58) Field of Classification Search .................. None  
See application file for complete search history.

(56) References Cited

U.S. PATENT DOCUMENTS

| | | | |
|---|---|---|---|
| 5,090,518 A | 2/1992 | Schenk et al. | |
| 5,107,967 A | 4/1992 | Fujita et al. | |
| 5,219,048 A | 6/1993 | Shaw et al. | |
| 5,352,028 A | 10/1994 | Eccleston | |
| 5,619,107 A * | 4/1997 | Shinohara et al. | 318/139 |
| 5,804,973 A * | 9/1998 | Shinohara et al. | 324/548 |
| 5,914,582 A | 6/1999 | Takamoto et al. | |
| 5,915,504 A | 6/1999 | Doricht | |
| 5,952,799 A | 9/1999 | Maisch et al. | |
| 5,994,789 A * | 11/1999 | Ochiai | 307/10.1 |
| 6,002,221 A * | 12/1999 | Ochiai et al. | 318/139 |
| 6,030,054 A * | 2/2000 | Doericht | 303/20 |
| 6,049,185 A * | 4/2000 | Ikeda | 318/442 |
| 6,189,981 B1 * | 2/2001 | Niedermeier | 303/20 |

(Continued)

FOREIGN PATENT DOCUMENTS

EP  269372 A2 *  6/1988

(Continued)

OTHER PUBLICATIONS

Tsuboi, JP06-276610, Machine Translation of detailed description from http://www19.ipdl.ncipi.go.jp/PA1/cgi-bin/PA1INDEX.*

*Primary Examiner*—Lincoln Donovan  
*Assistant Examiner*—Robert W. Horn  
(74) *Attorney, Agent, or Firm*—Crowell & Moring LLP

(57) ABSTRACT

A relay switch for selectively connecting a power supply line of an inverter to a ground line is inserted between the inverter and a power source, and a power consumption unit such as a resistor element is inserted between the relay switch and ground line.

13 Claims, 5 Drawing Sheets

U.S. PATENT DOCUMENTS

| | | |
|---|---|---|
| 6,199,670 B1 | 3/2001 | Shirai et al. |
| 6,257,377 B1 | 7/2001 | Schumann |
| 6,270,172 B1 | 8/2001 | Shirai et al. |
| 6,353,545 B1 * | 3/2002 | Ueda .................... 363/40 |
| 6,425,643 B2 | 7/2002 | Shirai et al. |
| 6,446,768 B2 * | 9/2002 | Kikuta et al. ............ 188/162 |
| 6,457,783 B1 | 10/2002 | Schanzenbach et al. |
| 6,550,871 B1 | 4/2003 | Bohm et al. |
| 6,653,806 B1 * | 11/2003 | Ono ........................ 318/375 |
| 6,657,408 B2 * | 12/2003 | Goto et al. .............. 318/442 |
| 6,679,355 B2 | 1/2004 | Suzuki |
| 6,687,590 B2 * | 2/2004 | Kifuku et al. ............. 701/43 |
| 6,702,069 B2 | 3/2004 | Ralea et al. |
| 6,752,247 B2 | 6/2004 | Hartsock |
| 6,752,614 B2 * | 6/2004 | Mizuno .................... 425/145 |
| 6,836,085 B2 | 12/2004 | Kawada et al. |
| 6,871,127 B2 | 3/2005 | Dominke et al. |
| 6,885,927 B2 * | 4/2005 | Arimura ..................... 701/41 |
| 6,890,041 B1 | 5/2005 | Ribbens et al. |
| 6,900,606 B2 * | 5/2005 | Youm ....................... 318/375 |
| 6,913,109 B2 * | 7/2005 | Kodama et al. ........... 180/446 |
| 6,919,710 B2 * | 7/2005 | Miyagi ..................... 320/133 |
| 6,923,510 B2 * | 8/2005 | Hac ........................... 303/122 |
| 6,956,751 B2 * | 10/2005 | Youm et al. ................ 363/37 |
| 6,959,791 B2 | 11/2005 | Usui |
| 7,052,093 B2 | 5/2006 | Suzuki et al. |
| 7,057,361 B2 * | 6/2006 | Kitahata et al. ........... 318/139 |
| 7,215,090 B2 * | 5/2007 | Kuramochi et al. ........ 318/139 |
| 2005/0046271 A1 * | 3/2005 | Suzuki et al. ............... 303/20 |
| 2005/0127749 A1 | 6/2005 | Hartmann et al. |
| 2005/0189890 A1 * | 9/2005 | Kuramochi et al. ........ 318/139 |
| 2007/0029953 A1 * | 2/2007 | Kuramochi et al. ........ 318/139 |

FOREIGN PATENT DOCUMENTS

| | | | |
|---|---|---|---|
| EP | 488240 A1 * | 6/1992 | |
| GB | 2 190 441 A | 11/1987 | |
| JP | 55097196 A * | 7/1980 | |
| JP | 57009264 A * | 1/1982 | |
| JP | 59050796 A * | 3/1984 | |
| JP | 60101601 A * | 6/1985 | |
| JP | 60180476 A * | 9/1985 | |
| JP | 61081170 A * | 4/1986 | |
| JP | 62077887 A * | 4/1987 | |
| JP | 62114492 A * | 5/1987 | |
| JP | 63161886 A * | 7/1988 | |
| JP | 63287396 A * | 11/1988 | |
| JP | 02136080 A * | 5/1990 | |
| JP | 03003697 A * | 1/1991 | |
| JP | 04207986 A * | 7/1992 | |
| JP | 05316748 A * | 11/1993 | |
| JP | 06276610 A * | 9/1994 | |
| JP | 07163045 A * | 6/1995 | |
| JP | 08033103 A * | 2/1996 | |
| JP | 08066033 A * | 3/1996 | |
| JP | 08107601 A * | 4/1996 | |
| JP | 09019003 A * | 1/1997 | |
| JP | 9-47055 | 2/1997 | |
| JP | 09037562 A * | 2/1997 | |
| JP | 09121592 A * | 5/1997 | |
| JP | 10248263 A * | 9/1998 | |
| JP | 11069881 A * | 3/1999 | |
| JP | 11215828 A * | 8/1999 | |
| JP | 11299280 A * | 10/1999 | |
| JP | 11308704 A * | 11/1999 | |
| JP | 11318085 A * | 11/1999 | |
| JP | 2000116143 A * | 4/2000 | |
| JP | 2001218304 A * | 8/2001 | |
| JP | 2002-039240 | 2/2002 | |
| JP | 2002199507 A * | 7/2002 | |
| JP | 2003-014014 | 1/2003 | |
| JP | 2003088144 A * | 3/2003 | |
| JP | 2005151729 A * | 6/2005 | |
| JP | 2005287137 A * | 10/2005 | |
| JP | 2005324878 A * | 11/2005 | |
| JP | 2006042459 A * | 2/2006 | |
| JP | 2006166495 A * | 6/2006 | |
| WO | WO 00/60255 | 10/2000 | |

* cited by examiner

CONTROL APPARATUS FOR ELECTRIC MOTOR OF INVERTER SYSTEM AND CONTROL APPARATUS FOR ELECTRO MECHANICAL BRAKE

CROSS-REFERENCE TO RELATED APPLICATIONS

This application is a continuation of U.S. application Ser. No. 11/052,742 filed Feb. 9, 2005 and claims priority of Japanese patent application no. 2004-054501 filed Feb. 27, 2004.

BACKGROUND OF THE INVENTION

The present invention relates to a control apparatus for an electric motor and a control apparatus for an electro mechanical brake, and more particularly to a control apparatus for an electric motor of an inverter system and a control apparatus for an electro mechanical brake to be used for a vehicle such as an automobile.

Controlling a torque of an electric motor by an inverter is applied to various electric motor control systems of a vehicle such as an automobile, e.g., an electric power running system, an electric power steering and an electro mechanical brake, respectively of an electric power automobile.

In such electric motor control systems, a power source input to an electric motor is short circuited in an abnormal state such as a turn-off of a main switch (e.g., refer to JP-A-9-47055).

In an electro mechanical brake using an electric motor as a thrust force source, as a fail safe for a defective wheel with a defect in a control system including software and hardware, a fail open function has been proposed which releases a thrust force of the defective wheel in order not to brake the vehicle (e.g., refer to JP-A-2002-39240 and JP-A-2003-14014). With the fail open function, when an abnormal state occurs, controlling an electric motor is stopped completely and a supply of electric energy to the electric motor is stopped to thereby release a thrust force.

An electro mechanical brake is installed to each of the four wheels of an automobile. If a braking force is applied only to a particular wheel during running, a yaw moment is applied to the vehicle about the axis of the braked wheel. This yaw moment curves the vehicle running direction depending upon a vehicle running speed (vehicle speed) and a road condition.

SUMMARY OF THE INVENTION

An important point of whether the vehicle running direction can be controlled to follow the handling of a driver, is a fast, instant and perfect release of an erroneous thrust force caused by a defect or malfunction of an electric motor among others.

A short circuit connection to a ground line of a power supply line from a power source to an inverter is more effective for releasing a thrust force, than a simple shutdown of an electric energy supply to an electric motor by turning off a main switch.

However, each phase of an inverter is generally provided with a large capacity smoothing condenser in order to mitigate a poor controllability caused by current pulsation during a motor rotation. Therefore, even if a power supply line to the inverter is shorted to the ground line by a switch unit, the perfect release of a thrust force is delayed until the smoothing condenser is completely discharged. An electro mechanical brake is desired to achieve the perfect release of a thrust force as soon as possible.

As described above, the issue to be solved by the present invention is to quickly extinguish the magnetization of the coil of an electric motor of an inverter control type when an abnormal state occurs and achieve the perfect release of a thrust force by an electro mechanical brake.

In order to solve the above-described issue, a control apparatus for an electric motor to be controlled by an inverter according to the present invention comprises: a switching unit for selectively switching a power supply line of the inverter to a ground line, the switching unit being inserted between the inverter and a power source; and a power consumption unit inserted between the switching unit and the ground line.

In the control apparatus for an electric motor of this invention, a motor control is performed through a feedback control, and the switching unit is closed upon occurrence of an abnormal state that a control deviation of the feedback control takes a predetermined value or larger.

In the control apparatus for an electric motor of this invention, the inverter is of a microcomputer control type, two microcomputers execute a same calculation process, and if calculation results by two microcomputers are not coincident, the switching unit is closed.

In the control apparatus for an electric motor of this invention, the electric motor is a drive source for an electro mechanical brake.

A control apparatus for an electro mechanical brake for generating a thrust force by making an electric motor to be controlled by an inverter push brake pads against a brake disk, according to the present invention comprises: a switching unit for selectively switching a power supply line of the inverter to a ground line, the switching unit being inserted between the inverter and a power source; and a power consumption unit inserted between the switching unit and the ground line.

The control apparatus for an electro mechanical brake of this invention further comprises a thrust force detecting unit for detecting a thrust force applied to the brake pads, wherein a feedback control is performed for the thrust force detected with the thrust force detecting unit, and the switching unit is closed upon occurrence of an abnormal state that a control deviation of the feedback control takes a predetermined value or larger.

In the control apparatus for an electro mechanical brake of this invention, the inverter is of a microcomputer control type, two microcomputers execute a same calculation process, and if calculation results by two microcomputers are not coincident, the switching unit is closed.

According to the control apparatus of this invention, for the electric motor, when an abnormal state occurs, the switching unit inserted between the inverter and power source connects the power source line of the inverter to the ground line and a power is consumed by the power consumption unit via the ground line. Discharge of smoothing condensers of the inverter can be performed at high speed, and coil magnetization of the electric motor can be distinguished at once. For the electro magnetic brake, a thrust force can be released completely and quickly.

Other objects, features and advantages of the invention will become apparent from the following description of the embodiments of the invention taken in conjunction with the accompanying drawings.

DESCRIPTION OF THE EMBODIMENTS

With reference to the accompanying drawings, detail description will be made on embodiments of a control apparatus for an electric motor and a control apparatus for an electro mechanical brake according to the invention.

Figure 1:
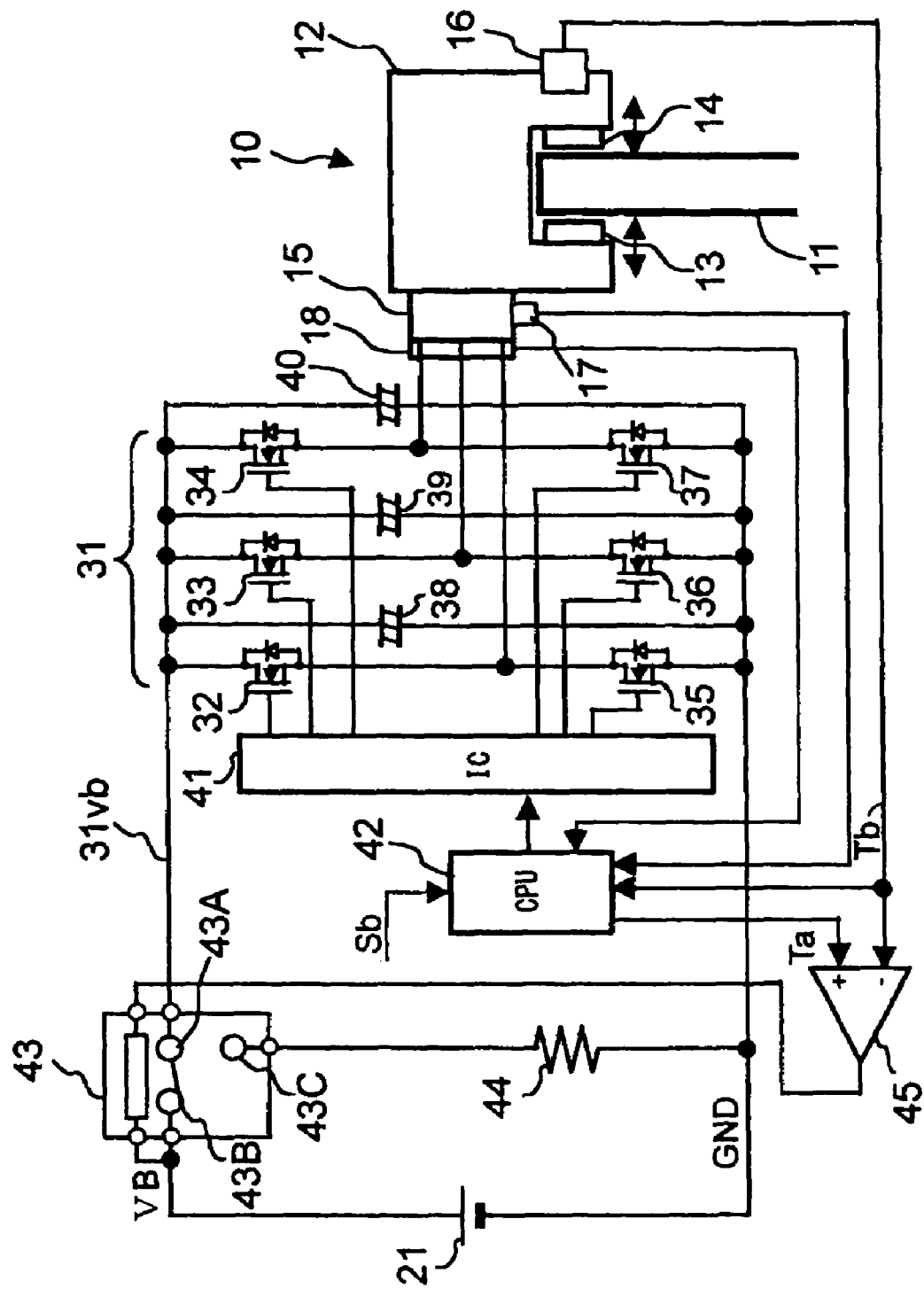
FIG. 1 is a circuit diagram of a control apparatus for an electro mechanical brake adopting a control apparatus for an electric motor according to a first embodiment of the present invention.

FIG. 1 shows the first embodiment of an electro mechanical brake. The electro mechanical brake 10 is mounted on each vehicle wheel and has a brake disk rotor 11 and an electric power caliper 12.

The electric power caliper 12 has a pair of brake pads 13 and 14 mounted on both sides of the brake disk rotor 11 and an electric motor 15 as a braking force generator for driving the brake pads 13 and 14. The electric power caliper 12 brakes the wheel by squeezing the brake disk rotor 11 between the brake pads 13 and 14.

As the electric motor 15, a three-phase electric motor (three-phase a.c. electric motor) is generally used because of the structural advantages in terms of controllability and lifetime.

The electric power caliper 12 has a built-in structure for converting a rotation motion of the electric motor 15 by coil magnetization into a linear motion. The electric power caliper 12 is a device for linearly moving the brake pads 13 and 14 to squeeze (push) the brake disk rotor 11 and generate a thrust force, and while the electric motor 15 is not under coil magnetization, the brake pads 13 and 14 are moved away from the brake disk rotor 11 by using built-in springs (not shown).

The electric power caliper 12 has a thrust force sensor 16 for sensing a generated thrust force. The electric motor 15 has a rotation position sensor 17 for detecting a motor rotation position and a current sensor 18 for detecting a motor drive current.

An electric power of a battery power source (d.c. power source) 21 is converted by an inverter 31 and supplied to the electric motor 15.

The inverter 31 has three-phase bridge drive elements 32, 33, 34, 35, 36 and 37 and smoothing condensers 38, 39 and 40. The inventer 31 is of a PWM type, i.e., a pulse width modulation type. A three-phase driver IC 41 switches the three-phase bridge drive elements 32, 33, 34, 35, 36 and 37 at timings determined by a duty signal of a PWM output from a microcomputer 42, to thereby control the rotation direction and rotation speed (rotation number) of the electric motor 15.

The smoothing condensers 38, 39 and 40 or capacitors provided to respective phases of the inverter 31 mitigate a poor controllability due to current pulsation during motor rotation.

The microcomputer 42 has as its inputs: an operation signal Sb corresponding to a depression amount of a not-shown brake pedal; a signal representative of an actual thrust force Tb output from the thrust force sensor 16; a signal representative of the motor rotation position output from the rotation position sensor 17; and a signal representative of a motor drive current output from the current sensor 18, generates a thrust force command value Ta through calculation of a feedback control of a thrust force, and outputs a duty signal for PWM control corresponding to the thrust force command value Ta to the three-phase driver IC 41.

A relay switch 43 as a switch unit is disposed between the battery power source 21 and inverter 31.

The relay switch 43 has: an inverter side contact 43A connected to a power supply line 31vb of the inverter 31; a battery side (power supply side) contact 43B connected to the anode side of the battery power source 21; and a ground side contact 43C connected to a ground line GND. The relay switch 43 is switched in response to an output signal from an arithmetic comparison unit 45. In a normal state, the inverter side contact 43A is connected to the battery side contact 43B, and in an abnormal state, the inverter side contact 43A is connected to the ground side contact 43C.

The ground side contact 43C is connected to the ground line via a power consumption resistor element 44.

In this embodiment, the arithmetic comparison unit 45 is a comparator made of an OP amplifier or the like. The arithmetic comparison unit 45 has as its inputs the thrust force command value Ta computed by the microcomputer 42 and the actual thrust force Tb output from the thrust force sensor 16, and compares the thrust force command value Ta and actual thrust force Tb. If a deviation F=the actual thrust force Tb−the thrust force command value Ta is equal to or smaller than a threshold value Fth, the arithmetic comparison unit 45 connects the inverter side contact 43A of the relay switch 43 to the battery side contact 43B. If only the state that the deviation F is larger than the threshold value Fth continues for a set time tth or longer, this state is judged abnormal, and the arithmetic comparison unit 45 outputs a signal (H level signal and L level signal) to connect the inverter side contact 43A to the ground side contact 43C.

Figure 2:
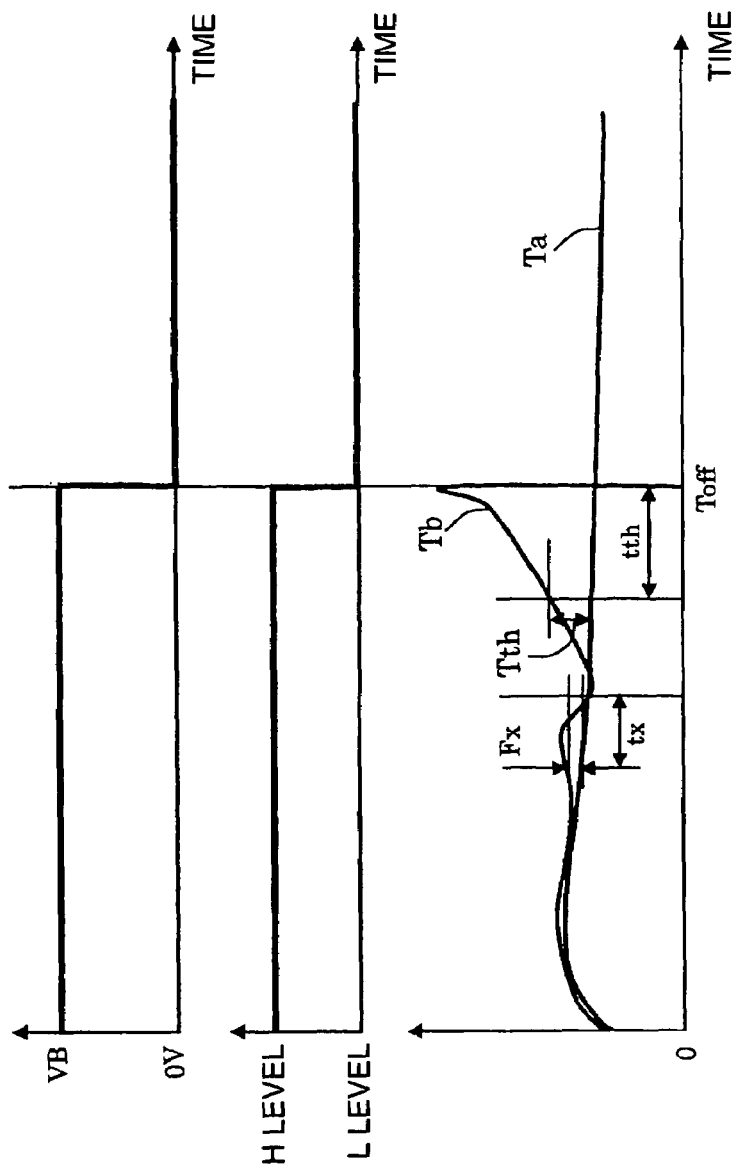
FIGS. 2A to 2C are timing charts illustrating the operation of the first embodiment.

With reference to FIGS. 2A to 2C, description will be made on an operation to be executed when an abnormal state occurs in the electro mechanical brake system and an abnormal thrust force not intended is generated by the electric power caliper 12.

In FIGS. 2A to 2C, reference symbol Ta represents the thrust force command value computed by the microcomputer 42, and reference symbol Tb represents the actual thrust force generated by the electric power caliper 12.

In the normal state, the actual thrust force Tb is generated which follows the thrust force command value Ta under the thrust force control by the microcomputer 42.

In some cases, a thrust force control deviation Fx or a response delay tx relative to the thrust force command value Ta may occur because of the influence of inertia of structural components of the electric power caliper. However, unless the state that the control deviation is larger than the value Fth continues for the set time tth or longer, the state is not judged abnormal and the ordinary thrust force control by the microcomputer 42 continues.

If any abnormal state occurs in the electro mechanical brake system and the state that the control deviation is larger than the value Fth continues for the set time tth or longer, it is judged that an abnormally excessive thrust force is apparently applied to the electro mechanical brake 10 of the wheel.

As an abnormal thrust force is applied only to a particular wheel, a yaw moment is applied to the vehicle, resulting in a running direction different from the steering by the driver.

A signal representative of the actual trust force Tb and the thrust force command value Ta are input to the arithmetic comparison unit 45 which always compare the actual thrust force Tb with the thrust force command value Ta.

When the abnormal thrust force is generated, at the time Toff, the output signal of the arithmetic comparator unit 45 transits from a preset H level signal (normal) to an L level signal (abnormal) so that the inverter side contact 43A of the relay switch 43 is switched from the battery side contact 43B to the ground side contact 43C.

The power supply (supply of a battery voltage VB) to the inverter 31 is therefore turned off. The power supply line 31$vb$ of the inverter 31 is connected via a power consumption unit 44 to the ground line GND to form a closed circuit on the inverter side.

With this closed circuit, the power accumulated in the smoothing condensers 38, 39 and 40 of the inverter 31 is consumed in the power consumption unit 44 and the power source side voltage of the inverter 31 lowers to the zero level quickly after the time Toff. Discharge of the smoothing condensers 38, 39 and 40 is executed at high speed and the coil magnetization of the electric motor 15 extinguishes quickly.

Even if the three-phase driver IC 41 executes the rotation control, the coil magnetization of the electric motor 15 is extinguished at once. As the coil magnetization is extinguished at once, the thrust force generated by the electric power caliper 12 is completely released at once so that the vehicle running direction caused by the abnormal thrust force and not intended can be avoided.

When an abnormal thrust force is generated, without involving the relay switch 43 and power consumption unit 44, the control by the microcomputer 42 may be stopped or the gates of the drive elements 32 to 37 for the inverter 31 may be turned off, to thereby stop the power supply to the electric motor. However, in this case, the coil magnetization of the electric motor 15 cannot be extinguished at once because of a time delay to be caused by a computation time of the microcomputer 42, the accumulated power in the smoothing condensers 38 to 40, a turn-off time of the drive elements 32 to 37 and the like.

If an abnormal thrust force is generated by a failure of the microcomputer 42 and a defective open/short of the drive elements 32 to 37 and the like, it is not effective to stop the control by the microcomputer 42 or turn off the gates of the drive elements 32 to 37 of the inverter 31 to stop the supply of a power to the electric motor 15.

In this embodiment, the electric power source is basically shut down by using the relay switch 43 and the electric energy remaining in the system electric series is consumed quickly by the power consumption unit 44 so that the coil magnetization of the electric motor 15 can be extinguished quickly.

Figure 3:
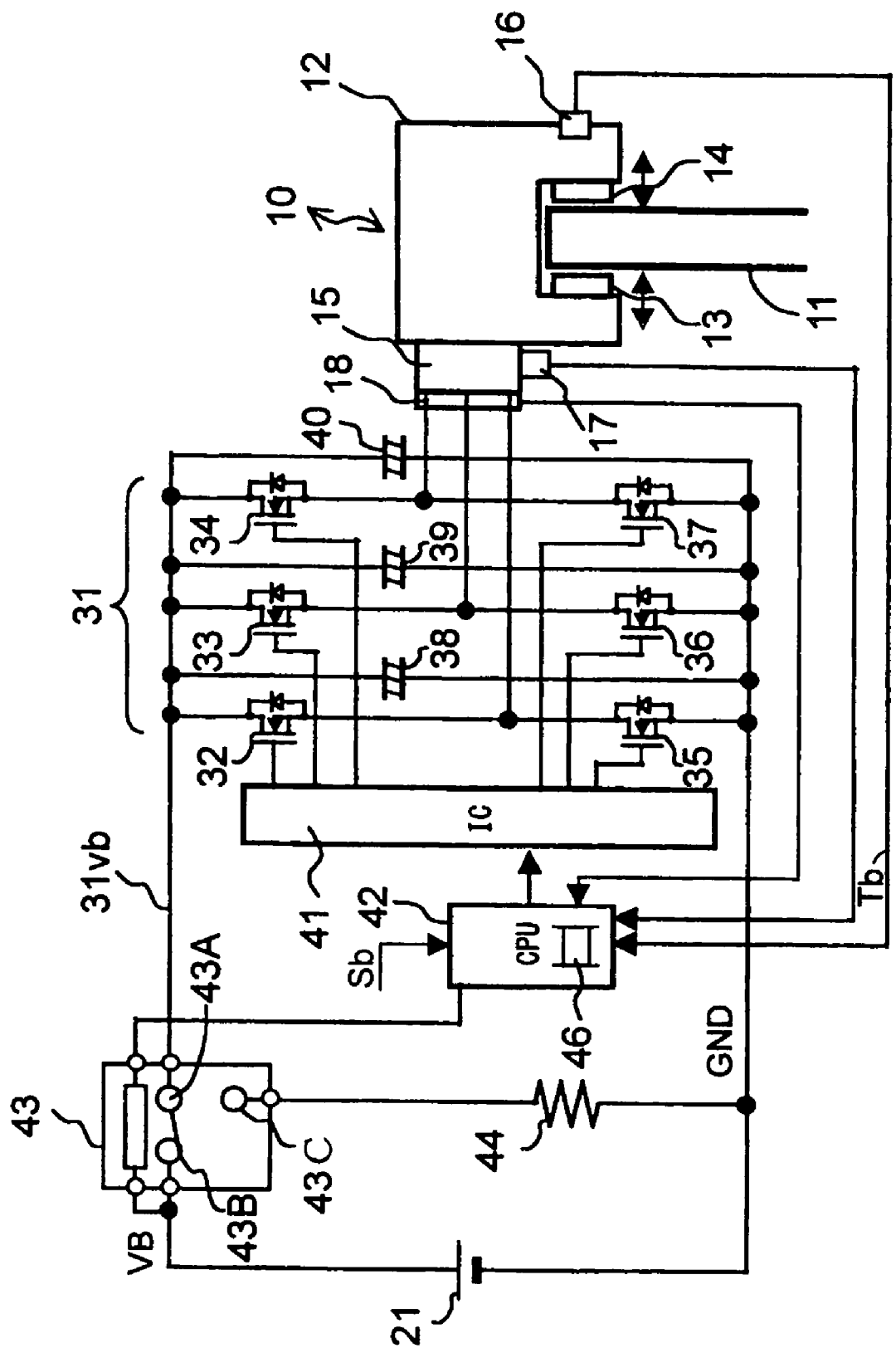
FIG. 3 is a circuit diagram of a control apparatus for an electro mechanical brake adopting a control apparatus for an electric motor according to a second embodiment of the present invention.

With reference to FIG. 3, description will be made on the second embodiment in which the control apparatus for the electric motor of the present invention is applied to the control apparatus for an electro mechanical brake. In FIG. 3, components similar to those shown in FIG. 1 are represented by identical reference numerals to those shown in FIG. 1 and the description thereof is omitted.

In the second embodiment, the arithmetic comparison for generating a command signal to the relay switch 43 is performed by software of the microcomputer 42, i.e., by a program to be executed by the microcomputer 42.

An arithmetic comparison routine 46 is executed by a real time interrupt. The microcomputer 42 compares the signal representative of the thrust force Tb input from the thrust force sensor 16 with the thrust force command value Ta obtained by the arithmetic process by the microcomputer 42. If a deviation F=the actual thrust force Tb−the thrust force command value Ta is equal to or smaller than a threshold value Fth, the inverter side contact 43A of the relay switch 43 is connected to the battery side contact 43B. If only the state that the deviation F is larger than the threshold value Fth continues for a set time tth or longer, this state is judged abnormal, and a signal (H level signal and L level signal) is output to connect the inverter side contact 43A to the ground side contact 43C.

Figure 4:
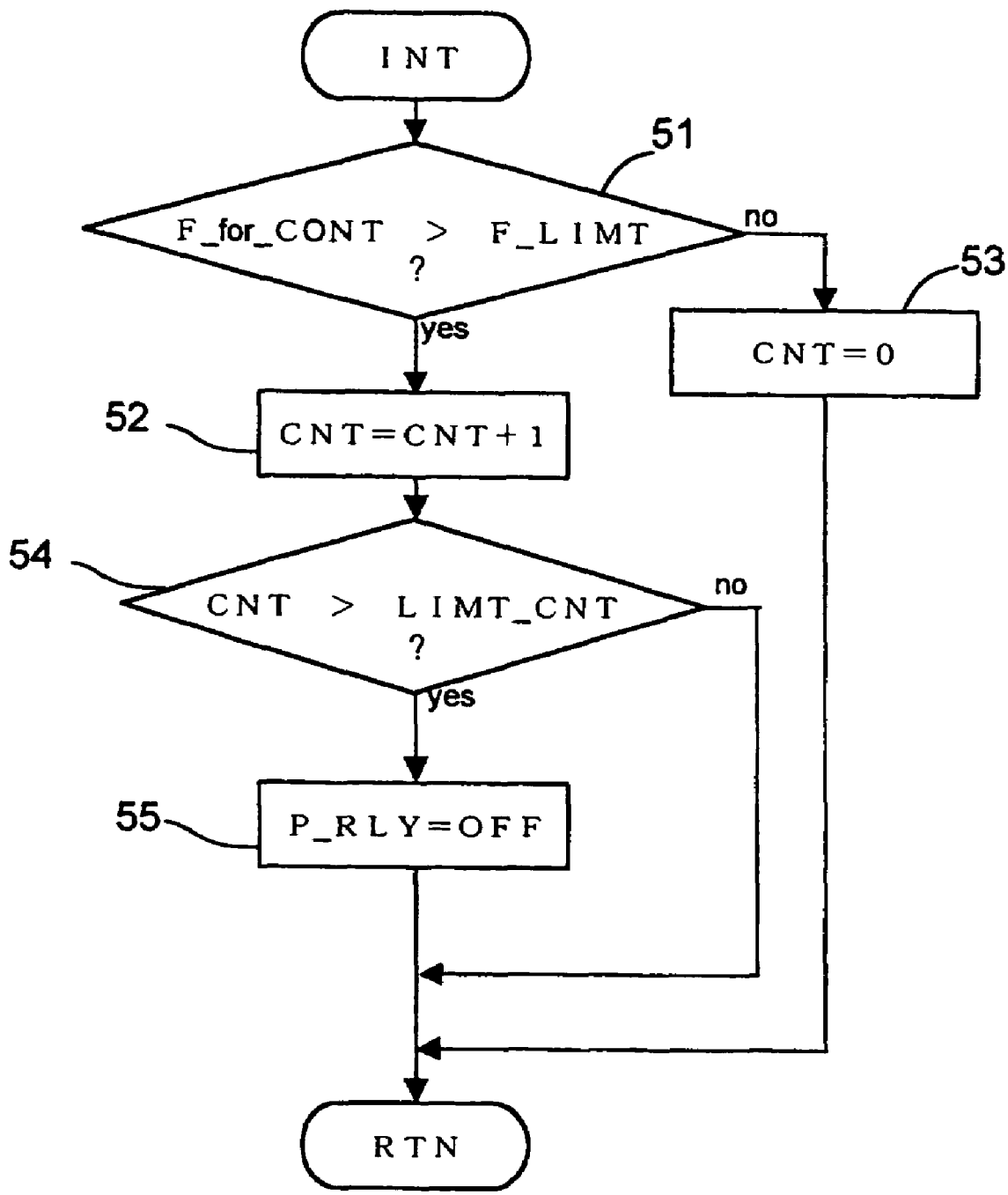
FIG. 4 is a flow chart illustrating a control sequence of the second embodiment.

With reference to the flow chart shown in FIG. 4, a specific process sequence of the arithmetic comparison routine 46 will be described.

First, the value written in F_for_CONT as the actual thrust force value (Tb), F_for_CONT being a RAM in the microcomputer 42, is compared with a predetermined thrust force limit value F_LIMT (Step 51). Since the limit value F_LIMT changes with the thrust force command value Ta, it is obtained by multiplying a predetermined coefficient or the value extracted from a map or the like is used.

In the comparison process at Step 51, if the value written in F_for_CONT is in excess of the thrust force limit value F_LIMT, a variable CNT for counting a thrust force abnormal state is incremented (Step 52).

On the other hand, if the value written in F_for CONT is not in excess of the thrust force limit value F_LIMT, the variable CNT is cleared to 0 (Step 53).

If the variable CNT is incremented, the value of the variable CNT is compared with an abnormal state limit counter value LIMT_CNT which is a predetermined constant (Step 54). If the value of the variable CNT is in excess of the limit counter value LIMT_CNT, a process R_RLY=OFF is executed which switches the relay switch 43 (Step 55). The inverter side contact 43A of the relay switch 43 is therefore switched from the battery side contact 43B to the ground side contact 43C.

Similar to the first embodiment, with this switching, the power supply (supply of the battery voltage VB) to the inverter 31 is therefore turned off. The power supply line 31$vb$ of the inverter 31 is connected via the power consumption unit 44 to the ground line GND to form a closed circuit on the inverter 31 side. With this closed circuit, the power accumulated in the smoothing condensers 38, 39 and 40 of the inverter 31 is consumed in the power consumption unit 44 and the power source side voltage of the inverter 31 lowers to the zero level quickly after the time Toff.

Even if the three-phase driver IC 41 executes the rotation control, the coil magnetization of the electric motor 15 is extinguished at once. As the coil magnetization is extinguished at once, the thrust force generated by the electric power caliper 12 is completely released at once so that the vehicle running direction caused by the abnormal thrust force and not intended can be avoided.

According to the second embodiment, the arithmetic comparison unit 45 of the first embodiment can be omitted and the structure can be simplified. There is therefore the merit that the parameter for extinguishing the thrust force can be changed freely.

Figure 5:
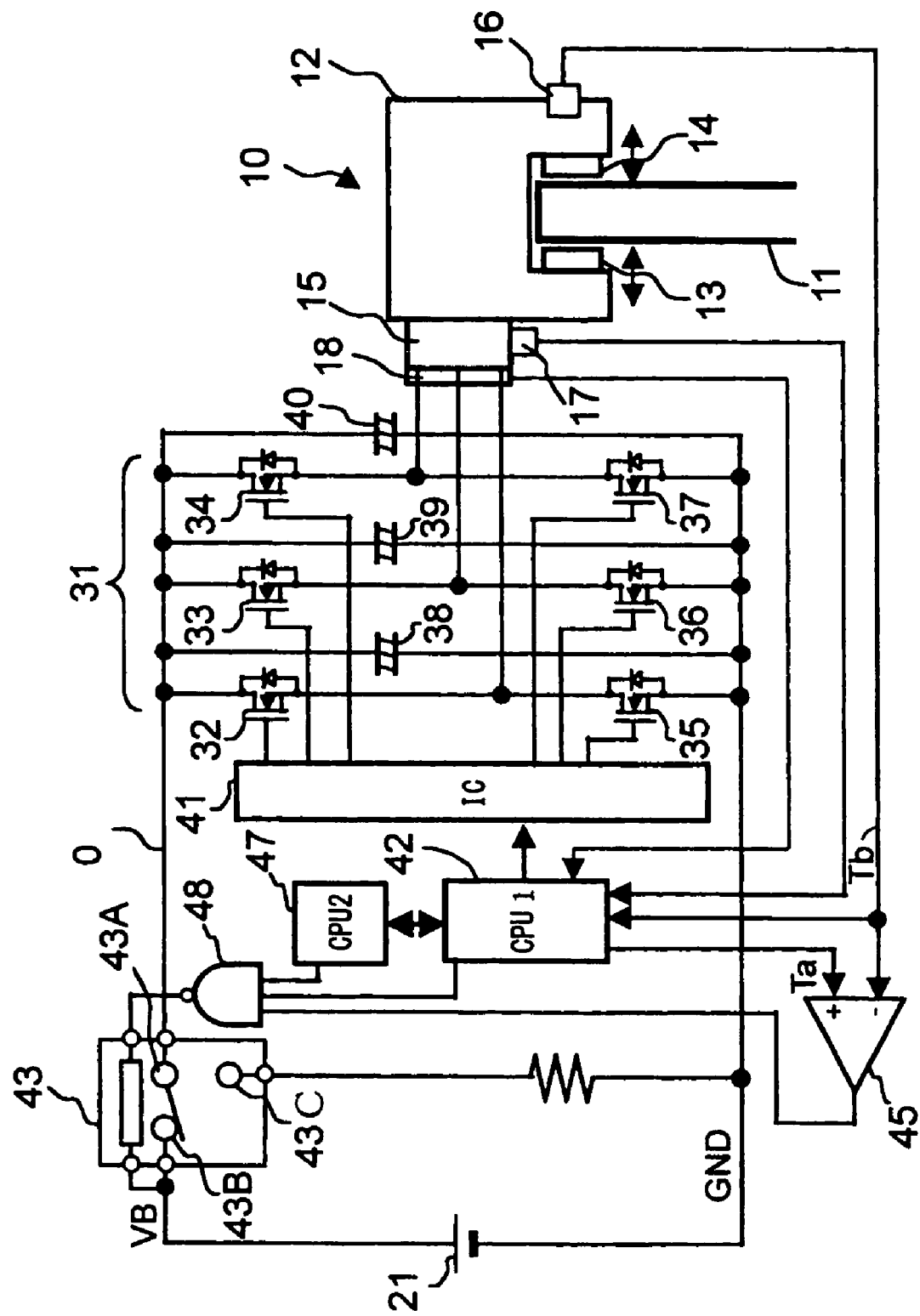
FIG. 5 is a circuit diagram of a control apparatus for an electro mechanical brake adopting a control apparatus for an electric motor according to a third embodiment of the present invention.

With reference to FIG. 5, description will be made on the third embodiment in which the control apparatus for the electric motor of the present invention is applied to the control apparatus for an electro mechanical brake. Also in FIG. 5, components similar to those shown in FIG. 1 are represented by identical reference numerals to those shown in FIG. 1 and the description thereof is omitted.

The third embodiment has a second microcomputer 47 in addition to the microcomputer 42 (in this embodiment, hereinafter called a first microcomputer 42). The first and second microcomputers 42 and 47 can communicate with each other.

Similar to the first embodiment, the first microcomputer 42 has as its inputs: an operation signal corresponding to a depression amount of an unrepresented brake pedal; a signal representative of the actual thrust force Tb output from the thrust force sensor 16; a signal representative of the motor rotation position output from the rotation position sensor 17; and a signal representative of a motor drive current output from the current sensor 18, generates the thrust force command value Ta through calculation of the input signals, and outputs a duty signal for PWM control corresponding to the thrust force command value Ta to the three-phase driver IC 41.

The second microcomputer 47 requests the first microcomputer 42 for the calculation, and compares the calculation result by the first microcomputer 42 with the calculation result by the second microcomputer 47 to thereby judge whether the calculation function of the first microcomputer 42 is normal.

Namely, the first and second microcomputers 42 and 47 execute the same calculation process and if the calculation results by the microcomputers 42 and 47 are not coincident, it is judged abnormal.

In accordance with this judgement result, the second microcomputer 47 outputs a signal (H level signal and L level signal) to a NAND gate 48. If the calculation result is not abnormal, the second microcomputer 47 outputs the H level signal to the NAND gate 48, whereas if the calculation result is abnormal, the second microcomputer 47 outputs the L level signal to the NAND gate 48.

The NAND gate 48 receives the signal from the second microcomputer 47 as well as the relay switch control signal (H level signal and L level signal) equivalent to the signal output from the arithmetic comparison unit 45 of the first embodiment, and outputs a signal representative of a NAND logical value to the relay switch 43.

With this structure, even if any one of the first and second microcomputers 42 and 47 and arithmetic comparison unit 45 becomes defective, it is possible to switch the inverter side contact 43A of the relay switch 43 to the ground side contact 43C when an abnormal thrust force is generated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for an electro mechanical brake for generating a thrust force by causing an electric motor, controlled by an inverter, to push brake pads against a brake disk, said control apparatus comprising:

switching means for selectively switching a power supply line of said inverter to a ground line, said switching means being inserted between said inverter and a power source;

power consumption means inserted between said switching means and said ground line; and thrust force detecting means for detecting a thrust force applied to said brake pads; wherein, a feedback control is performed for the thrust force detected with said thrust force detecting means;

said switching means is closed upon occurrence of an abnormal state in which a control deviation of the feedback control equals or exceeds a predetermined value;

said inverter is of a microcomputer control type; and two microcomputers execute the same calculation process, and if calculation results by two microcomputers are not coincident, said switching means is closed.

2. An electro mechanical brake, comprising:

a caliper which includes brake pads which squeeze a disk rotor rotating together with a wheel of a vehicle therebetween to apply a braking force to the wheel, a motor which generates a rotation torque when supplied with electric energy, a mechanism for converting a rotation motion of the motor into a linear motion, and a fail open mechanism which releases the braking force when supply of the electric energy to the motor is stopped;

an inverter which supplied the electric energy to the motor based on electric energy supplied from a power supply mounted on the vehicle;

a capacitor coupled in parallel to the inverter;

a power consumption circuit which consumes electric power accumulated in the capacitor;

a switch device;

a sensor which detects an operation state of the caliper; and a microcomputer, wherein the microcomputer detects the operation state of the caliper from a detection value of the sensor, and when the caliper is determined to be in an abnormal state from a result of the detection, stops supply of the electric energy to the inverter and controls the switch device so as to couple the inverter and the capacitor to the power consumption circuit.

3. An electro mechanical brake according to claim 2, wherein the microcomputer subjects the inverter to a PWN control, and conducts a feedback control of a duty ratio of the PWM control so that the operation state of the caliper becomes a command value of the operation state of the caliper based on the command value and the detection value of the sensor.

4. An electro mechanical brake according to claim 2, wherein the fail open mechanism is a spring, and the brake pads are separated from the disk rotor in a state where a coil of the motor is not magnetized by the spring.

5. An electro mechanical brake according to claim 2, wherein the inverter includes negative and positive power supply lines for supplying a DC power and three switch circuits coupled between the negative and positive power supply lines in a parallel manner, each of the switch circuits being configured by two switching elements coupled in series, and power being supplied to the motor from a coupling portion between the two switching elements of each of the witch circuits, wherein the capacitor is configured by a plurality of capacitor elements coupled in parallel, and the plurality of capacitor elements coupled between the negative and positive power supply lines so as to be parallel to the three switch circuits.

6. An electro mechanical brake according to claim 2, wherein
the switch device includes a first contact point coupled to the power supply, a second contact point coupled to the inverter and a third contact point coupled to the power consumption circuit, wherein
the microcomputer, when the caliper is determined to be in the abnormal state, switches from a state where the first and second points are coupled to each other to a state where the second and third points are coupled to each other.

7. An electro mechanical brake according to claim 2, wherein
the sensor is a thrust force sensor for detecting a pressing force applied from the brake pad to the disk rotor, and wherein
the microcomputer determines that the caliper is in the abnormal state when a thrust force value detected by the thrust force sensor is out of a set value.

8. An electro mechanical brake according to claim 7, wherein the microcomputer changes the set value in accordance with a thrust force command value inputted therein.

9. An electro mechanical brake according to claim 2, wherein
the inverter includes negative and positive power supply lines for supplying a DC power and three switch circuits coupled between the negative and positive power supply lines in a parallel manner, each of the switch circuits being configured by two switching elements coupled in series, and power being supplied to the motor from a coupling portion between the two switching elements of each of the witch circuits, wherein
the capacitor is configured by a plurality of capacitor elements coupled in parallel, and the plurality of capacitor elements coupled between the negative and positive power supply lines so as to be parallel to the three switch circuits.

10. An electro mechanical brake according to claim 2, wherein the fail open-mechanism is a spring, and the brake pads are separated from the disk rotor in a state where a coil of the motor is not magnetized by the spring.

11. An electro mechanical brake according to claim 2, wherein
the inverter includes negative and positive power supply lines for supplying a DC power and three switch circuits coupled between the negative and positive power supply lines in a parallel manner, each of the switch circuits being configured by two switching elements coupled in series, and power being supplied to the motor from a coupling portion between the two switching elements of each of the witch circuits, wherein
the capacitor is configured by a plurality of capacitor elements coupled in parallel, and the plurality of capacitor elements coupled between the negative and positive power supply lines so as to be parallel to the three switch circuits.

12. An electro mechanical brake according to claim 2, wherein
the switch device includes a first contact point coupled to the power supply, a second contact point coupled to the inverter and a third contact point coupled to the power consumption circuit, wherein
the microcomputer, when the caliper is determined to be in the abnormal state, switches from a state where the first and second points are coupled to each other to a state where the second and third points ate coupled to each other.

13. An electro mechanical brake, comprising:
a caliper which includes brake pads which squeeze a disk rotor rotating together with a wheel of a vehicle therebetween to apply a braking force to the wheel, a motor which generates a rotation torque when supplied with electric energy, a mechanism for converting a rotation motion of the motor into a linear motion, and a fail open mechanism which releases the braking force when supply of the electric energy to the motor is stopped;
an inverter which supplied the electric energy to the motor based on electric energy supplied from a power supply mounted on the vehicle;
a capacitor coupled in parallel to the inverter;
a power consumption circuit which consumes electric power accumulated in the capacitor;
a switch device;
a sensor which detects an operation state of the caliper;
a first microcomputer which receives detection values on the operation state of the caliper and executes a calculation and uses the calculation to generate a command value for the operation of the caliper, wherein the microcomputer conducts a feedback control of the inverter based on the said command values and the said calculation;
the second microcomputer receives the operation values of the caliper and the calculation results from the first microprocessor, executes the same calculation process, and compares the results of calculation by the first computer with result by the second microcomputer, determines whether the calculation function of the first microcomputer is normal and if the calculation results by the computers are not coincident, the second microcomputer determines the caliper to be in an abnormal state and issues a signal; and
a switch control circuit which obtains the result of the operation of the first microcomputer and a result of the operation of the second microcomputer, and in accordance with the operation results of the first and second microcomputers, stops supply of the electric energy to the inverter and controls the switch device and outputs to the switch device a control signal for coupling the inverter and the capacitor to the power consumption circuit.

* * * * *